United States Patent
Johnson et al.

(10) Patent No.: US 11,200,745 B2
(45) Date of Patent: Dec. 14, 2021

(54) SYSTEMS, METHODS, AND MEDIA FOR AUTOMATICALLY TRIGGERING REAL-TIME VISUALIZATION OF PHYSICAL ENVIRONMENT IN ARTIFICIAL REALITY

(71) Applicant: Facebook Technologies, LLC, Menlo Park, CA (US)

(72) Inventors: Samuel Alan Johnson, Redwood City, CA (US); Mahdi Salmani Rahimi, San Francisco, CA (US); Shaik Shabnam Nizamudeen Basha, Sunnyvale, CA (US); Belinda Heywood, Alameda, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/773,897

(22) Filed: Jan. 27, 2020

(65) Prior Publication Data
US 2021/0233314 A1 Jul. 29, 2021

(51) Int. Cl.
*G09G 5/00* (2006.01)
*G06T 19/00* (2011.01)
(Continued)

(52) U.S. Cl.
CPC ........ *G06T 19/006* (2013.01); *G02B 27/0172* (2013.01); *G06T 7/0002* (2013.01);
(Continued)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS

| 10,124,257 B2 | 11/2018 | Stafford |
| 2003/0034974 A1 | 2/2003 | Welch |

(Continued)

FOREIGN PATENT DOCUMENTS

| EP | 2660643 A2 | 11/2013 |
| EP | 3163407 A1 | 5/2017 |

(Continued)

OTHER PUBLICATIONS

Ballan, et al., Unstructured Video-Based Rendering: Interactive Exploration of Casually Captured Videos, ACM Trans. Graph. (Proc. Siggraph) 29, Article 87, Issue 4, 11 pages, Jul. 2010.

(Continued)

*Primary Examiner* — Gordon G Liu
(74) *Attorney, Agent, or Firm* — Baker Botts L.L.P.

(57) ABSTRACT

In particular embodiments, a computing system may display a virtual-reality scene on a device worn by a user. The system may capture an image of a physical environment surrounding the user and detect an object of interest in the image. The system may determine, based on the detected object, that one or more alert criteria are satisfied. The system may generate depth measurements of at least the object. The system may generate, based on the depth measurements, a model representing the object. The system may render, based on a viewpoint of the user and the model, an output image depicting a visualization of the object. The system may display the output image on the device worn by the user in response to the determination that the one or more alert criteria are satisfied.

20 Claims, 9 Drawing Sheets

(51) Int. Cl.
*G06T 7/50* (2017.01)
*G02B 27/01* (2006.01)
*G06T 7/00* (2017.01)
*G06T 15/00* (2011.01)

(52) U.S. Cl.
CPC .............. *G06T 7/50* (2017.01); *G06T 15/005* (2013.01); *G02B 2027/0138* (2013.01)

(58) Field of Classification Search
USPC ........................................................ 345/633
See application file for complete search history.

(56) References Cited

U.S. PATENT DOCUMENTS

| | | |
|---|---|---|
| 2012/0092328 A1 | 4/2012 | Flaks |
| 2013/0005467 A1 | 1/2013 | Kim |
| 2013/0093788 A1 | 4/2013 | Liu |
| 2015/0235610 A1 | 8/2015 | Miller |
| 2017/0287215 A1 | 10/2017 | Lalonde |
| 2017/0365100 A1 | 12/2017 | Walton |
| 2018/0067316 A1 | 3/2018 | Lee |
| 2018/0068488 A1 | 3/2018 | Hart |
| 2018/0088323 A1 | 3/2018 | Bao |
| 2018/0232056 A1* | 8/2018 | Nigam .................... G06F 3/013 |
| 2018/0364801 A1* | 12/2018 | Kim ....................... G06T 19/006 |
| 2019/0101758 A1 | 4/2019 | Zhu |
| 2019/0197765 A1 | 6/2019 | Molyneaux |
| 2019/0213789 A1 | 7/2019 | Uyyala |
| 2019/0220002 A1* | 7/2019 | Huang ..................... G06T 7/70 |
| 2019/0243448 A1 | 8/2019 | Miller |
| 2020/0020166 A1 | 1/2020 | Menard |
| 2020/0026922 A1* | 1/2020 | Pekelny ................ G06T 19/006 |
| 2020/0334908 A1 | 10/2020 | Wilson |

FOREIGN PATENT DOCUMENTS

| | | |
|---|---|---|
| GB | 2376397 A | 12/2002 |
| WO | WO 2017079657 A1 | 5/2017 |

OTHER PUBLICATIONS

Chaurasia, et al., Depth Synthesis and Local Warps for Plausible Image-based Navigation, ACM Trans Graph 32, 3, Article 30, 12 pages, Jun. 2013.
Chaurasia, et al., Silhouette-Aware Warping for Image-Based Rendering. Comput. Graph. Forum (Proc. EGSR)30, 4 (2011), pp. 1223-1232, 2011.
Chen, QuickTime VR—an Image-Based Approach to Virtual Environment Navigation, in ACM Siggraph 1995 Conference Proceedings, pp. 29-38, 1995.
Chen, et al., View Interpolation for Image Synthesis, in ACM Siggraph 1993 Conference Proceedings, pp. 279-288, 1993.
Fanello, et al., Low Compute and Fully Parallel Computer Vision with HashMatch, In the IEEE International Conference on Computer Vision (ICCV), pp. 1-11, 2017.
Gu, et al., Application of Motion Vector in Live 3D Object Reconstruction, Patterns 2011: The Third International Conferences on Pervasive Patterns and Applications, pp. 41-46, 2011.
Hedman, et al., Casual 3D Photography, ACM Transactions on Graphics, Article 234, 36(6):1-15, 2017.
Hedman, et al., Instant 3D Photography, ACM Transactions on Graphics, Article 101, 37(4):1-12, Aug. 2018.
Hirschmuller, et al., Memory Efficient Semi-Global Matching, ISPRS Annals of the Photogrammetry, Remote Sensing and Spatial Information Sciences, vol. I-3, 2012 XXII ISPRS Congress, Melbourne, Australia, pp. 371-376, Sep. 2012.
Hirschmuller, et al., Stereo Processing by Semiglobal Matching and Mutual Information, IEEE Transactions on Pattern Analysis and Machine Intelligence, 30(2):328-341, Feb. 2008.
Holynski, et al., Fast Depth Densification for Occlusion-aware Augmented Reality, ACM Transactions on Graphics, Article 194, 37(6):1-11, Nov. 2018.
Hornung, et al., Interactive Pixel-Accurate Free Viewpoint Rendering from Images with Silhouette Aware Sampling, Computer Graphics, 0(1981):1-13, 2009.
Kanade, et al., A Stereo Machine for Video-rate Dense Depth Mapping and Its New Applications, Proceedings of 15th Computer Vision and Pattern Recognition Conference (CVPR), San Francisco, pp. 1-7, Jun. 1996.
Kang, et al., Extracting View-Dependent Depth Maps from a Collection of Images, International Journal of Computer Vision 58(2):139-163, 2004.
Levin, et al., Colorization using Optimization, The Hebrew University of Jerusalem, ACM 0733-0301/04/01)00-0689, pp. 689-694, 2004.
Lipski, et al., Virtual Video Camera: Image-Based Viewpoint Navigation Through Space and Time, Computer Graphics, pp. 1-12, 2010.
Martino, et al., An Analysis and Implementation of Multigrid Poisson Solvers with Verified Linear Complexity, Image Processing on Line 8 (2018), pp. 192-218, 2018.
Matzen, et al., Low-Cost 360 Stereo Photography and Video Capture, ACM Transactions on Graphics, Article 148, 36(4): 1-13, Jul. 2017.
McMillan, et al., Plenoptic Modeling: An Image-Based Rendering System, Proceedings of Siggraph 95, Los Angeles, California, pp. 1-8, Aug. 1995.
Nover, et al., ESPReSSo: Efficient Slanted PatchMatch for Real-time Spacetime Stereo, Google, pp. 1-9.
Perez, et al., Poisson Image Editing, Microsoft Research UK, CM 0730-0301 03 0700-0313, pp. 313-318, 2003.
Shum, et al., Image-Based Rendering, Springer Science Business Media, LLC, 213 pages, 2007.
Sinha, et al., Piecewise Planar Stereo for Image-based Rendering, Microsoft, pp. 1-8.
Stich, et al., View and Time Interpolation in Image Space, Pacific Graphics, 27(7):1-7, 2008.
Szeliski, Computer Vision: Algorithms and Applications, pp. 1-481, Aug. 5, 2010.
Szeliski, et al., Locally Adapted Hierarchical Basis Preconditioning, Microsoft Research, pp. 1-39, May 2006.
Valentin, et al., Depth from Motion for Smartphone AR, CM Trans. Graph., Article 193, 37(6):1-19, Nov. 2018.
Vangorp, et al., Perception of Perspective Distortions in Image-Based Rendering, ACM Trans Graph, 32(4):1-35, Jul. 2013.
Vangorp, et al., Perception of Visual Artifacts in Image-Based Rendering of Facades, Computer Graphics Forum, Wiley, Proceedings of the Eurographics Symposium on Rendering, 30(4):1-11, Jul. 8, 2011.
Zitnick, et al., High-quality video view interpolation using a layered representation, ACM 073341301/04.42000.0700, pp. 600-608, 2004.
Zitnick, et al., Stereo for Image-Based Rendering using Image Over-Segmentation, Kluwer Academic Publishers, pp. 1-32, 2006.
International Search Report and Written Opinion for International Application No. PCT/US2020/067020, dated Apr. 19, 2021.
International Search Report and Written Opinion for International Application No. PCT/US2020/067055, dated Apr. 21, 2021.

\* cited by examiner

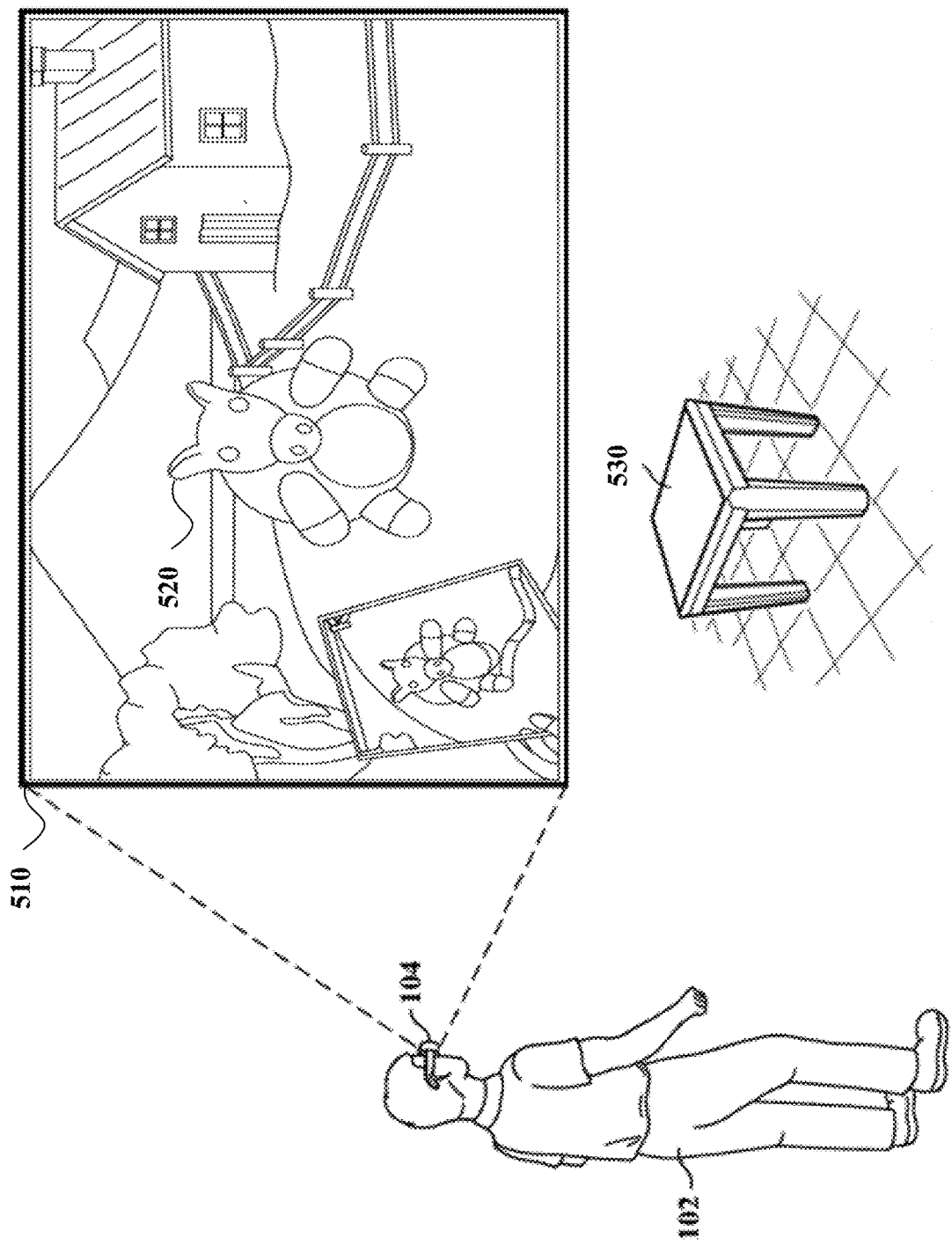

SYSTEMS, METHODS, AND MEDIA FOR AUTOMATICALLY TRIGGERING REAL-TIME VISUALIZATION OF PHYSICAL ENVIRONMENT IN ARTIFICIAL REALITY

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, his vision of the physical environment is occluded by the physical structure of the HMD. For example, the displays of the HMD could be positioned directly in front of and in close proximity to the user's eyes. Thus, whenever the user needs to see his physical surroundings, he would need to remove the HMD. Even if the removal of the HMD is temporary, doing so is inconvenient and disruptive to the user experience.

SUMMARY OF PARTICULAR EMBODIMENTS

Embodiments described herein automatically alert a user who is immersed in artificial reality of notable events occurring in his physical surroundings. One issue with HMDs is that they block the user's vision. As such, when wearing an HMD, a user may feel a sense of anxiety being disconnected from the physical world. In addition, the user may be concerned with privacy, as he is unable to see whether anyone has entered his environment. To address such issues, embodiments described herein provide a feature that automatically alerts the user when notable events occur in his environment. For example, while a user is wearing an HMD, the associated computing system may detect that another person has entered the room and, in response, generate a visible, audible, or haptic alert to inform the user of the presence of the other person.

The alerts may be triggered based on any sensory cue that indicates another person is present. For example, images captured by the HMD (or by any other linked cameras, such as home security cameras or the user's mobile phone) may be processed using a machine-learning model to detect the presence of another person. The motion of that person may also be taken into consideration when deciding whether to trigger an alert. For example, an alert may be triggered if the detected person is gesturing at, speaking to, or walking towards the user. Alerts may also be triggered based on audio (e.g., doorbell, someone talking, etc.).

The alert may take a variety of forms. For example, visual alerts could include a blinking icon, a message, a pass-through image of the detected person, a full passthrough of the user's environment, etc. A radar visual may also be used to inform the user of the relative location of the detected person. In other embodiments, the alerts may be a sound (e.g., a particular tone, computer-generated utterance, etc.) and/or haptic feedback (e.g., the HMD or hand-held controllers may vibrate, etc.).

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 5A and 5B illustrate an example of a passthrough visualization being presented to a user upon detection of another person entering the user's physical surroundings.

DESCRIPTION OF EXAMPLE EMBODIMENTS

Artificial reality—especially virtual reality—is designed to provide users with an immersed experience separate from the real world. The immersive experience is attributable in part to the HMD providing simulated content and shielding the real world from the user's vision. However, while a user is immersed in artificial reality, the user may wonder what is occurring in his physical surroundings. For example, the user may wonder whether anyone has entered the room without him knowing. The user may also worry if a dynamic object (e.g., a person, pet, or robot) has entered his play space and present a safety concern. The lack of awareness of the physical environment may cause anxiety in the user or distract the user from being fully immersed in the artificial world. In addition, when the user senses the presence of another person through other sensory means (e.g., by sound, smell, or touch), he may wish to see who or where the person is and what the person is doing. To do so, users of traditional HMD systems would need to at least temporarily remove the HMD. For systems that have controllers, the user may further need to put down at least one of the controllers in order to free up a hand to remove the HMD. These actions could significantly disrupt the user's immersive artificial-reality experience.

Embodiments described herein monitor the physical surroundings of a user who is immersed in artificial reality and provide real-time alerts upon the detection of noteworthy events. In particular embodiments, the alert may include visual information about the user's surroundings. The visual information, which may be referred to as "passthrough," allows the user to see his physical surroundings while wearing an HMD. Information about the user's physical environment is visually "passed through" to the user by having the HMD display information captured by the headset's external-facing cameras. Simply displaying the captured images would not work as intended, however. Since the locations of the cameras do not coincide with the locations of the user's eyes, the images captured by the cameras do not accurately reflect the user's perspective. In addition, since the images have no depth, simply displaying the images would not provide the user with proper parallax effects if he were to shift away from where the images were taken. Thus, rather than simply displaying the captured images, the passthrough feature extracts information about the environment from the captured images (e.g., depth information), use the information to generate a 3D model of the environment, and reconstruct a scene of the modeled environment from the user's current viewpoint.

Figure 1:
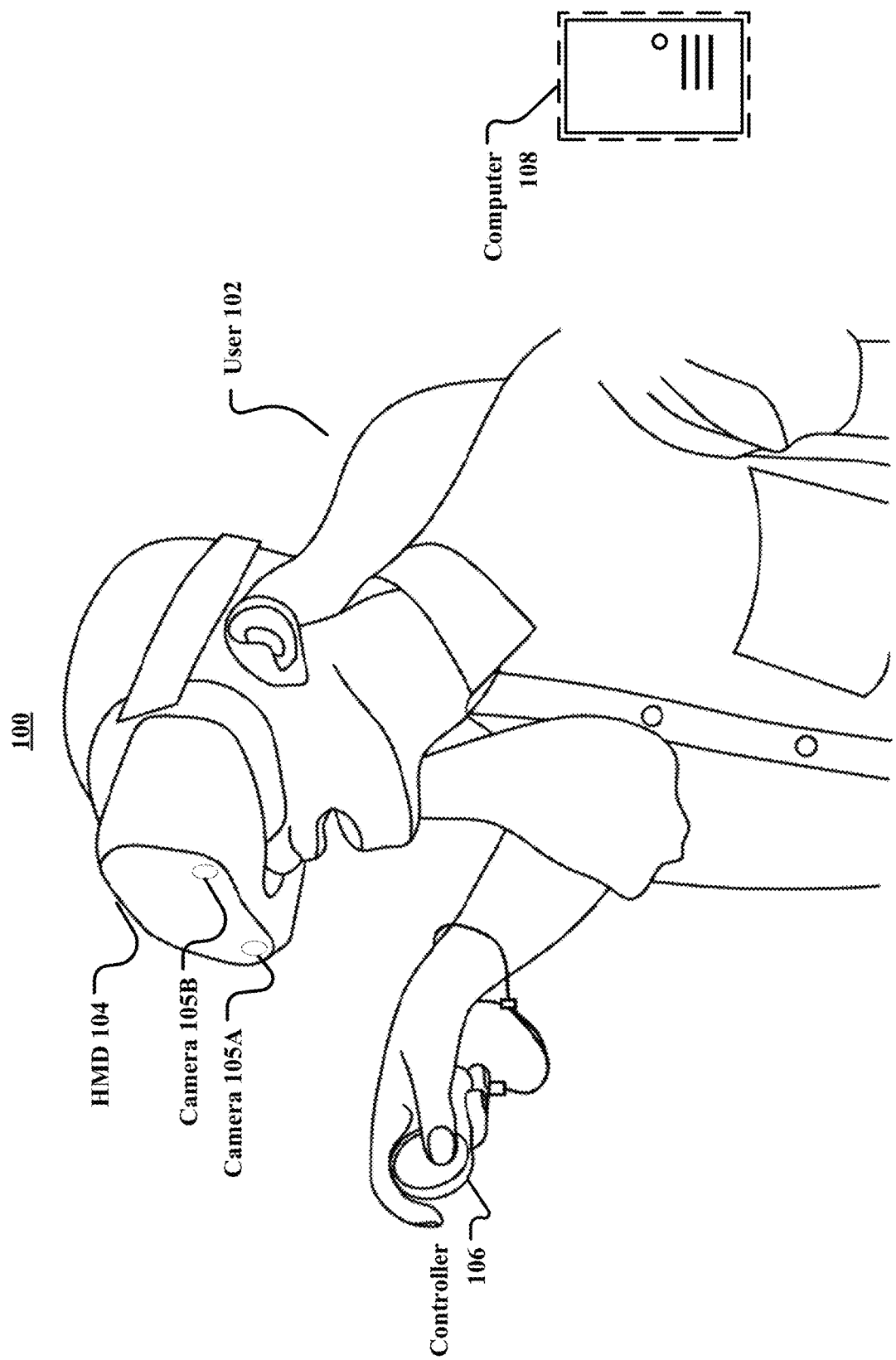
FIG. 1 illustrates an example artificial reality system worn by a user, in accordance with particular embodiments.

FIG. 1 illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings.

The HMD 104 may have external-facing cameras, such as the two forward-facing cameras 105A and 105B shown in FIG. 1. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 105A-B may be directly displayed to the user 102 via the HMD 104, doing so would not provide the user with an accurate view of the physical environment since the cameras 105A-B cannot physically be located at the same location as the user's eyes. As such, the passthrough feature described herein uses a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 2:
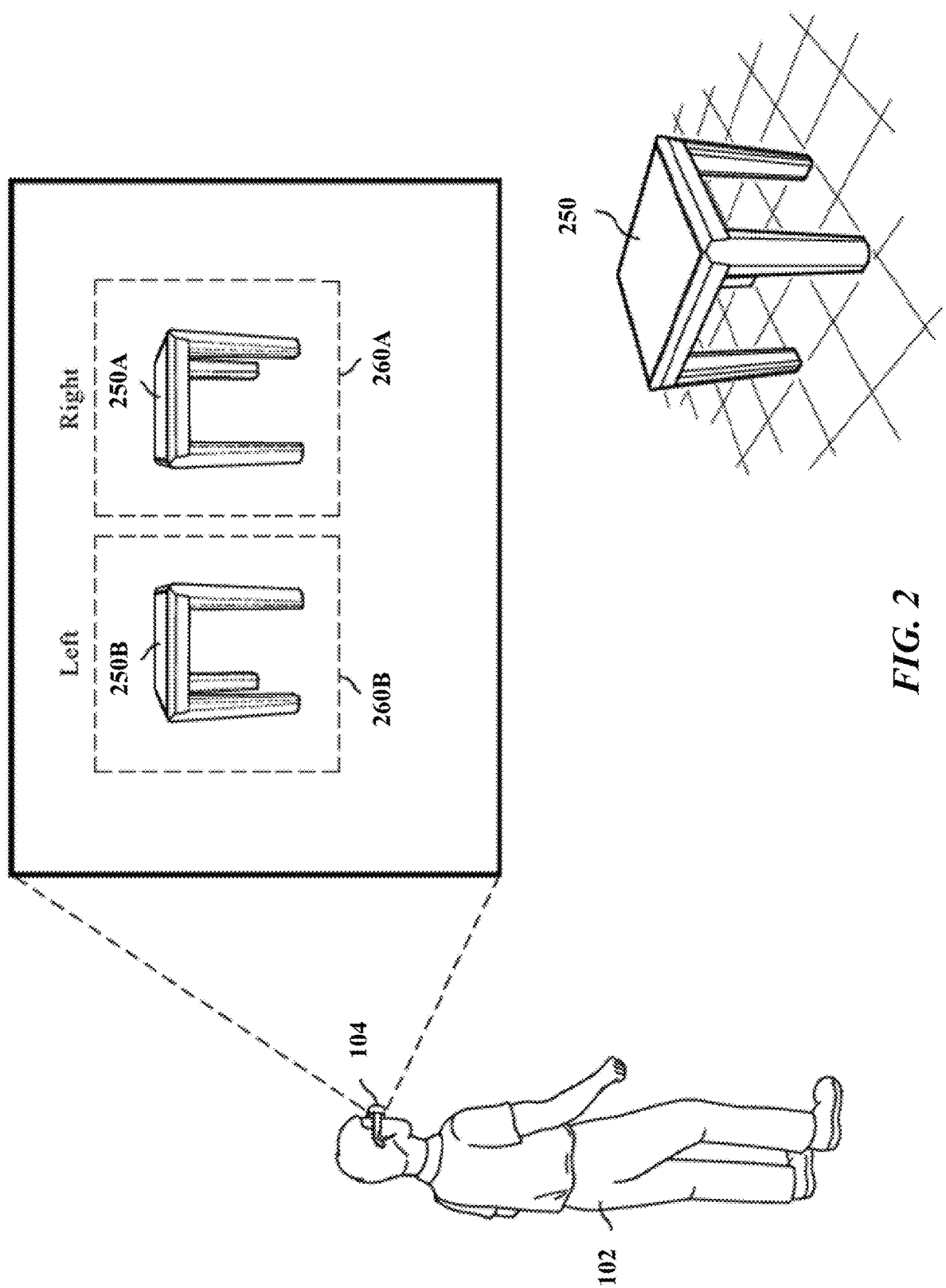
FIG. 2 illustrates an example of a passthrough feature, in accordance with particular embodiments.

FIG. 2 illustrates an example of the passthrough feature. A user 102 may be wearing an HMD 104, immersed within a virtual reality environment. A physical table 250 is in the physical environment surrounding the user 202. However, due to the HMD 104 blocking the vision of the user 102, the user is unable to directly see the table 250. To help the user 102 perceive his physical surroundings while wearing the HMD 104, the passthrough feature captures information about the physical environment using, for example, external-facing cameras 105A-B of the HMD 104. The captured information may then be re-projected to the user 102 based on his viewpoints. In particular embodiments where the HMD 104 has a right display 260A for the user's right eye and a left display 260B for the user's left eye, the computing system 108 may individually render (1) a re-projected view 250A of the physical environment for the right display 260A based on a viewpoint of the user's right eye and (2) a re-projected view 250B of the physical environment for the left display 260B based on a viewpoint of the user's left eye.

Figure 3:
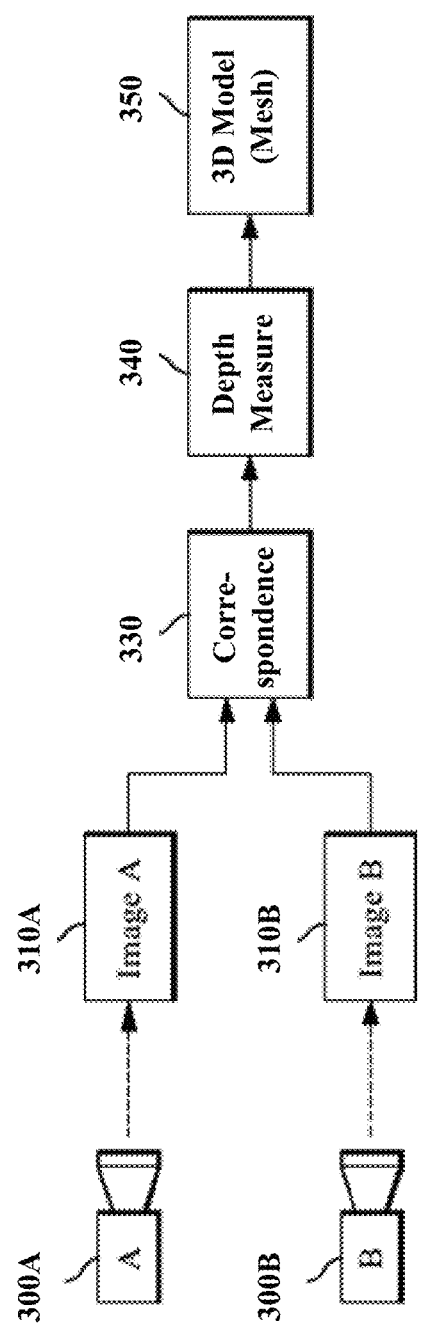
FIG. 3 illustrates an example process for modeling the physical environment surrounding the user, in accordance with particular embodiments.

FIG. 3 illustrates an example process for modeling the physical environment surrounding the user, in accordance with particular embodiments. Information about the physical environment may be captured using any suitable sensors. For example, FIG. 3 illustrates a pair of stereo cameras 300A and 300B that are a known distance apart and have a shared field of view. The stereo cameras 300A and 300B may simultaneously capture stereo images 310A and 310B, respectively. Each pair of simultaneously captured stereo images 310A-B may be used to estimate the depths of observed features. As explained above, to measure depth using triangulation, a computing unit would determine correspondences 330 between pixels of the stereo images 310A-B. For example, the computing unit would determine which two pixels in the pair of stereo images 310A-B correspond to the same observed feature. Based on the pixel correspondences 330, along with the known spatial relationship between the cameras 300A-B, the computing unit may use triangulation or other suitable techniques to estimate the depth 340 of the feature captured by the pixels. The depth measurements 340 of the observable features in the environment may then be used to construct a 3D model 350 to represent the physical environment.

A high-performance computing unit may solve the correspondence problem using a GPU and optical flow techniques, which are optimized for determining correspondences. The correspondence information may then be used to compute depths using triangulation techniques. Based on the computed depths of the observed features, the computing unit could determine where those features are located within a 3D space (since the computing unit also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user would be computed from the perspective of the user's eyes, rather than from the perspective of the external-facing cameras.

The process described above, however, may not be feasible for a resource-limited computing device (e.g., a mobile phone may be the main computational unit for the HMD). For example, unlike systems with powerful computational resources and ample energy sources, a mobile phone may not be able to rely on GPUs and computationally-expensive algorithms (e.g., optical flow) to perform depth measurements and generate an accurate 3D model of the environment. Thus, to provide passthrough on resource-limited devices, an optimized process is needed.

Resource-limited devices, such as mobile phones, may leverage video encoders to determine correspondences, in accordance with particular embodiments. A video encoder (hardware or software) is designed to be used for video compression. It is common on any computing device capable of capturing and displaying video, even resource-limited ones like mobile phones. The video encoder achieves compression by leveraging the temporal consistency that is often present between sequential frames. For example, in a video sequence captured by a camera that is moving relative to an environment, the frame-by-frame difference would likely be fairly minimal. Most objects appearing in one frame would continue to appear in the next, with only slight offsets relative to the frame due to changes in the camera's perspective. Thus, instead of storing the full color values of all the pixels in every frame, the video encoder predicts where the pixels in one frame (e.g., a frame at time t, represented by $f_t$) came from in a previous frame (e.g., a frame at time t−1, represented by $f_{t-1}$), or vice versa. The encoded frame may be referred to as a motion vector. Each grid or cell in the motion vector corresponds to a pixel in the frame $f_t$ that the motion vector is representing. The value in each grid or cell stores a relative offset in pixel space that identifies the likely corresponding pixel location in the previous frame $f_{t-1}$. For example, if the pixel at coordinate (10, 10) in frame $f_t$ corresponds to the pixel at coordinate (7, 8) in the previous frame $f_{t-1}$, the motion vector for frame $f_t$ would have grid or cell at coordinate (10, 10) that specifies a relative offset of (−3, −2) that could be used to identify the pixel coordinate (7, 8).

In particular embodiments, the correspondences between two stereo images 310A-B may be computed using a device's video encoder. Using an API provided for the device's video encoder, the computing unit tasked with generating the passthrough feature may instruct the video encoder to process the two stereo images 310A and 310B. However, since video encoders are designed to find correspondence between sequential frames captured at a high frame rate (e.g., 30, 60, 80, or 100 frames-per-second), which means that sequential frames are likely very similar, having the video encoder find correspondences between two simultaneously captured stereo images 310A-210B may yield suboptimal results. Thus, in particular embodiments, one or both of the images 310A-B may undergo a translation based on the known physical separation between the two cameras 300A and 300B so that the images 310A and 310B would be more similar.

The output of the video encoder may be a motion vector that describes the predicted correspondences between images 310A and 310B using per-pixel offsets. The motion vector, however, could be noisy (i.e., many of the correspondences could be inaccurate). Thus, in particular embodiments, the motion vector may undergo one or more verification filters to identify the more reliable correspondence predictions. For example, one verification filter may use the known geometry of the cameras 300A and 300B to determine epipolar lines for each pixel. Using the epipolar line associated with each pixel, the computing device could determine whether the corresponding pixel, as identified by the motion vector, is a plausible candidate. For example, if the corresponding pixel falls on or within a threshold distance of the epipolar line, then the corresponding pixel may be deemed plausible. Otherwise, the corresponding pixel may be deemed implausible and the correspondence result would be rejected from being used in subsequent depth computations.

In particular embodiments, the verification filter may assess the reliability of a correspondence found by the motion vector based on temporal observations. This temporal filtering process may be applied to the original motion vector or only to a subset of the motion vector that survived the epipolar filtering process. For each correspondence undergoing the temporal filtering process, the system may compute the depth value using triangulation. The depth values may be represented as a point cloud in 3D space. The temporal filtering process may check whether the same points can be consistently observed through time. For example, the computing system may have a camera capture an image from a particular current perspective and compare it to a projection of the point cloud into a screen space associated with the current perspective. As an example, given the current perspective, the device may compute where, in screen space (e.g., the location of a particular pixel), the user should see each point in the point cloud. This may be done by projecting each point towards a point representation of the current perspective. As each point is being projected, it passed through a screen space of the current perspective. The location where the projected point intersects the screen space corresponds to a pixel location where that point is expected to appear. By comparing the projected pixel location to the same pixel location in the captured image, the system could determine whether the two pixels likely correspond to each other. If so, that point in the point cloud gets a positive vote; otherwise, it gets a negative vote. The points with a sufficiently high vote would be used as the final set of reliable points. After the verification filtering process, the system would have a collection of stereo outputs or depth measurements.

In particular embodiments, the computing device may be configured to dynamically determine, at runtime, whether it is capable of or able to generate depth measurements using (1) the GPU and optical flow or (2) the video encoder and motion vectors. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Once the computing device has generated a point cloud based on the depth measurements, it may generate a 3D mesh representation of the observed environment. For high-performance devices, accurate models of objects in the environment may be generated (e.g., each object, such as a table or a chair, may have its own 3D model). However, for resource-limited devices, the cost of generating such models and/or the underlying depth measurements for generating the models may be prohibitive. Thus, in particular embodiments, the 3D mesh representation for the environment may be a coarse approximation of the general contour of the objects in the environment. In particular embodiments, a single 3D mesh may be used to approximate all the objects observed. Conceptually, the 3D mesh is analogous to a blanket or sheet that covers the entire observable surfaces in the environment. In particular embodiments, the mesh may be initialized to be equal-distance (e.g., 1, 2, 2.5, or 3 meters) from a viewer or camera. Since the 3D mesh is equal-distance away from the viewer, it forms a hemisphere around the user. The 3D mesh may be deformed according to the depth measurements of the observed physical objects in order to model the contour of the environment. In particular embodiments, the 3D mesh may be deformed based on the viewer's position and a point-cloud representation of the depth measurements. To determine which portion of the 3D mesh corresponds to each point in the point cloud, the computing device may cast a conceptual ray from the viewer's position towards that point. Each ray would intersect with a primitive (e.g., a triangle or other polygon) of the 3D mesh. As a result, the point of intersection on the mesh is deformed based on the depth value associated with the point through which the ray was cast. For example, if the depth measurement of the point is 2.2 meters away from the viewer, the initial 2-meter depth value associated with the point of intersection on the mesh may be changed to 2.2 meters. Once this process has been completed for each point in the point cloud, the resulting deformed mesh would represent the contour of the physio) environment observed by the viewer.

Figure 4:
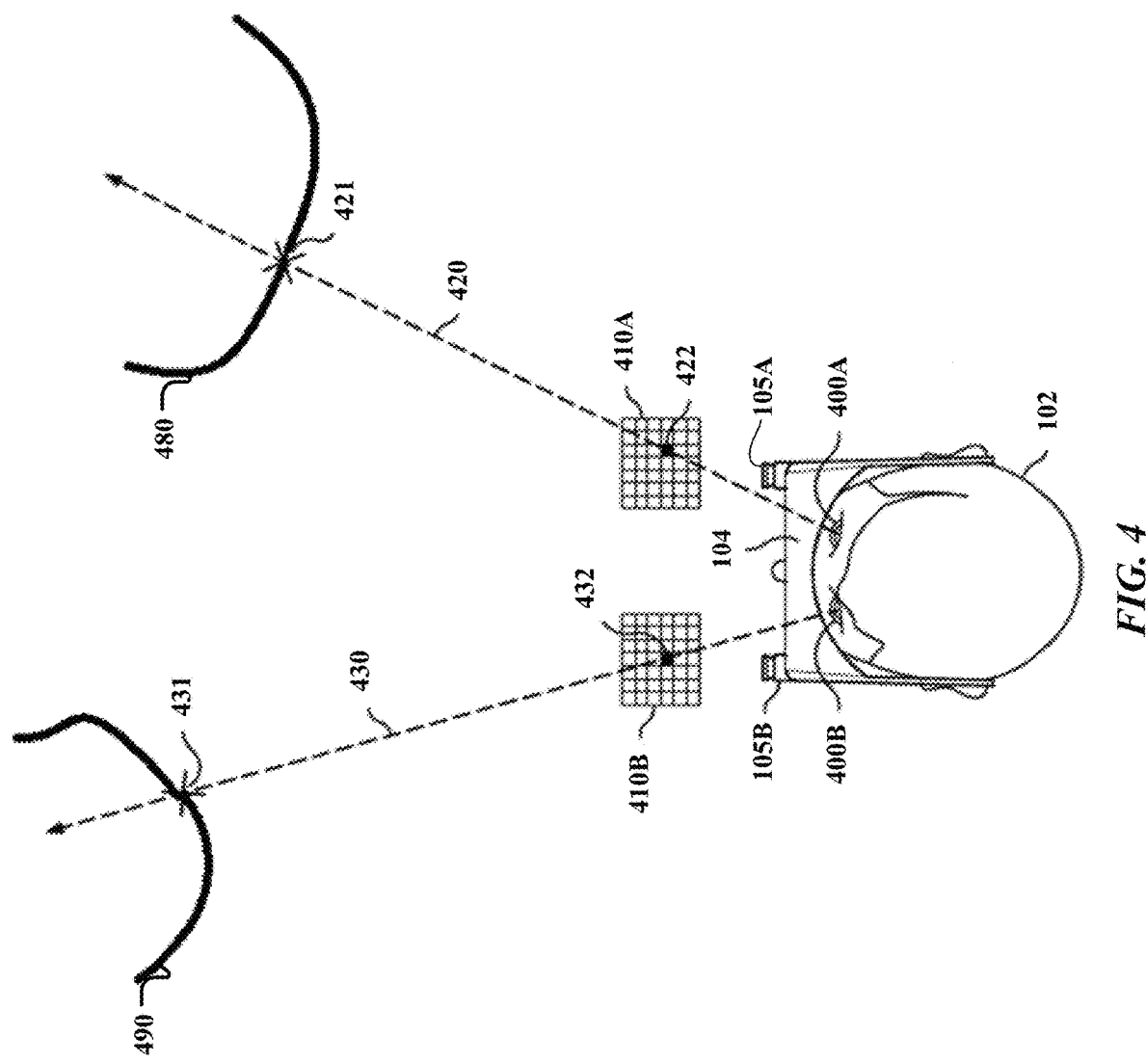
FIG. 4 provides an illustration of 3D-passthrough rendering based on a 3D model of the environment.

FIG. 4 provides an illustration of 3D-passthrough rendering based on a 3D model of the environment. In particular embodiments, the rendering system may determine the user's 102 current viewing position relative to the environment. In particular embodiments, the system may compute the pose of the HMD 104 using SLAM or other suitable techniques. Based on the known mechanical structure of the HMD 104, the system could then estimate the viewpoints of the user's eyes 400A and 400B using offsets from the pose of the HMD 104. The system may then render a passthrough image for each of the user's eyes 400A-B. For example, to render a passthrough image for the user's right eye 400A, the system may cast a ray 420 from the estimated viewpoint of the right eye 400A through each pixel of a virtual screen space 410A to see which portion of a 3D model would be intersected by the ray 420. This ray casting process may be referred to as a visibility test, as the objective is to determine what is visible from the selected viewpoint 400A. In the particular example shown, the ray 420 projected through a particular pixel 422 intersects with a particular point 421 on the 3D model 480. This indicates that the point of intersection 421 is to be displayed by the pixel 422. Once the point of intersection 421 is found, the rendering system may sample a corresponding point in a texture image that is mapped to the point of intersection 421. In particular embodiments, the image captured by the cameras 105A-B of the HMD 104 may be used to generate a texture for the 3D model 480. Doing so allows the rendered image to appear more like the actual physical object. In a similar manner, the rendering system may render a passthrough image for the user's left eye 400B. In the example shown, a ray 430 may be cast from the left-eye viewpoint 400B through pixel 432 of the left screen space 410B. The ray 430 intersects the 3D model 490 at location 431. The rendering system may then sample a texture image at a texture location corresponding to the location 431 on the model 490 and compute the appropriate color to be displayed by pixel 432. Since the passthrough images are re-rendered from the user's viewpoints 400A-B, the images would appear natural and provide proper parallax effect.

In particular embodiments, the passthrough images of the physical environment generated using the above process may be displayed to the user without further post-processing. However, it may be desirable in certain embodiments to minimize the visual representation of the physical environment to make the passthrough feature less intrusive to the ongoing virtual-reality experience. Thus, in particular embodiments, a gradient filter may be applied to the rendered passthrough images. In particular embodiments, the gradient filter visualizes changes in color or intensity between neighboring pixels. Thus, the gradient would typically highlight the edges or features of objects depicted in images. The gradient of the images results in a line-based outline of the objects. The line-based visualization approach reduces the amount of the screen that would need to be colored, which means that a higher percentage of what the user sees would be virtual-reality content. Another benefit of using the gradient is that it would not favor any particular color (e.g., darker colors would not be emphasized over lighter colors), since the gradient identifies contrasts.

In particular embodiments, the outline of physical objects may be displayed with a uniform color tint to help contrast the passthrough information from virtual-reality content. The particular color tint of the passthrough feature may be selectable by the user. The color tint may also be selected by the application whose virtual-reality content is being displayed. This flexibility allows an application to select a color tint that would sufficiently contrast the general color scheme of the virtual content being provided. For example, if a game has a level that takes place in a fiery environment (e.g., in a volcano), the game may request the passthrough feature to be displayed in blue. When the user advances to the next level that takes place in a world of ice, the game may request the passthrough feature to be displayed in red.

Figure 5B:
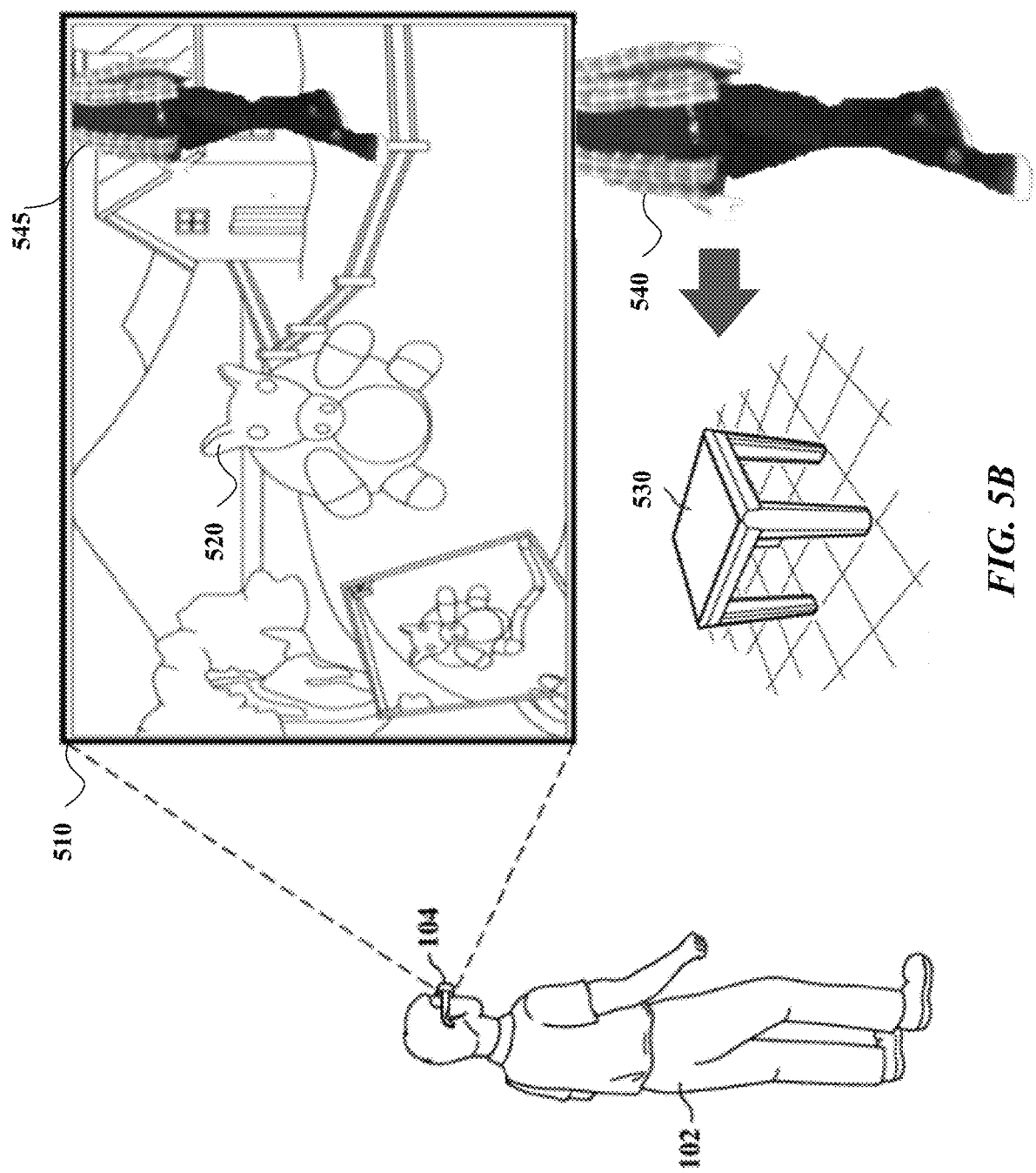

In particular embodiments, a passthrough visualization may be displayed to the user automatically upon detection of an event of interest. For example, FIGS. 5A and 5B illustrate an example of a passthrough visualization being presented to a user upon detection of another person entering the user's physical surroundings. FIG. 5A illustrates a user 102 wearing an HMD 104. The HMD 104 may be displaying a scene 510, which may include any number of virtual objects, such as the virtual animal 520. As previously described, a computing system may render and display separate images for the user's left and right eyes (e.g., as shown in FIG. 2), but for simplicity, FIG. 5A only displays a single image. The virtual objects in the scene 510 may be predefined by its developer and not based on any visible object within the user's physical surroundings. For example, the virtual animal 520 in the scene 510 may be rendered based on a 3D model defined by a content developer. Even though there is a table 530 in the user's physical environment, it is not being shown in the displayed scene 510.

FIG. 5B illustrates an example of passthrough information 545 being displayed to alert the user 102 that another person 540 has been detected. In particular embodiments, a computing system associated with the artificial-reality device may use any suitable computer-vision technique to detect the presence of the other person 540. In particular embodiments, the mere detection of the person 540 may trigger the corresponding passthrough visualization 545 to be displayed in the scene 510. In this manner, the user 102 is alerted of the presence of the person 540 and provided with corresponding visual information, even though the physical environment is not directly visible to the user 102 due to the HMD 104.

In the particular example above, the alert was triggered when the presence of another person was detected. However, the alert feature may be triggered based on any suitable trigger logic. For instance, in particular embodiments, the trigger logic may be based on semantic information extracted from images of the physical environment. For example, the HMD 104 worn by the user 102 may have one or more external-facing cameras (e.g., 105A-B) that are configured to take continuous images of the user's 102 surroundings. In particular embodiments, images of the user's 102 surroundings may be captured by one or more non-HMD cameras that are communicatively linked with the computing system of the artificial-reality device. For example, the computing system may be connected to (e.g., wirelessly or via a wire) one or more of a mobile phone, a security camera system, or stand-alone cameras (e.g., webcams).

Semantic information associated with the captured images may be generated using any suitable computer-vision technique. Semantic information may include, for example, objects (e.g., person, adult, children, pets, ball, furniture, etc.) and/or events (e.g., a person waving at the user, speaking in the direction of the user, pointing a camera or phone at the user, moving towards the user, or throwing an object at the user). For example, a machine-learning model, such as Mask R-CNN, may be trained to detect, identify, and/or generate an instance segmentation mask for particular objects of interest. The machine-learning model may be trained to find any type of animate (e.g., humans, adults, children, dogs, cats, robots, etc.) or inanimate objects (e.g., furniture, ball, cups, etc.). The machine-learning model may also learn to detect certain events (e.g., a person waving at, speaking to, or moving towards the user). The machine-learning model, in particular embodiments, may be a neural network. The network may be trained using a set of training images with labeled ground truths. For example, a training image depicting a person and a dog may have (1) a corresponding mask that identifies bounding boxes around where the person and the dog appear in the image, (2) corresponding labels or classifications indicating that the bounding boxes contain a person and a dog, and/or (3) a pre-generated instance segmentation mask identifying pixels in the image that correspond to the person and the dog. During each training iteration, the network may generate a prediction (e.g., bounding box location, classification, and/or instance segmentation mask). The prediction may be compared to the ground truth using a loss function, and the comparison results may be used to update the network so that it would perform better in the next iteration. After a threshold number of training iterations or until the prediction of the network is sufficiently close to the ground truths (e.g., as measured by the loss function), training may terminate. At that point, the trained machine-learning model may be used to detect, in real-time, semantic information from captured images.

In particular embodiments, the computing system may assess the confidence in the detected semantic information before deciding whether to trigger an alarm. Since predictions made by a machine-learning model may not be perfectly accurate, the computing system may verify the likelihood of a prediction being correct before trigging an alarm. For example, the machine-learning model may indicate that a person is detected within a captured frame. Rather than reacting to the single prediction and triggering an alarm, the computing system may verify whether the person is consistently detected across multiple frames. For example, if the person is detected in the next five frames, the system would have improved confidence that a person is indeed present in the user's physical environment and trigger an alarm. Conversely, if the person is not detected in the next few frames, the system may conclude that the initial detection was erroneous and not trigger an alarm. In particular embodiments, the machine-learning model may output a confidence score for each of its predictions. The confidence score may be used by the computing system to make triggering decisions. For example, if the confidence score for a single-frame prediction is high (e.g., as compared to a predetermined confidence threshold, such as 70%, 80%, or 90%), the computing system may trigger an alarm. However, if the confidence score is lower than the threshold, the computing system may take an average of the confidence scores associated with a sequence of frames to decide whether the average score is sufficient (e.g., relative to a predetermined threshold confidence) to trigger an alarm.

In particular embodiments, the trigger for presenting an alarm may be based on a prediction for whether another person (or pet) is likely to enter a play space of the user. The play space may be a defined region around the user which the user can expect is free of hazards. In particular embodiments, the play space may be defined by the user (e.g., the user may use a controller to draw a boundary around himself to define his play space). The play space may alternatively be defined automatically based on computer-vision techniques (e.g., a floor space without objects above it may be defined as the user's play space). In other embodiments, the play space may be defined as a radius around the user.

In particular embodiments, after the computing system detects a person in a captured frame, it may track the movement of the person over a sequence of frames to determine the person's trajectory. The person's movement trajectory, as determined over time, may be used to determine whether the person is likely to enter the user's play space. For example, if the other person would enter the user's play space if his current movement trajectory is maintained, then an alert may be triggered. In that case, the alert may be triggered even before the person actually enters the user's play space. In particular embodiments, the computing system may also identify objects in the physical environment and use such information to determine whether the detected person is likely to enter the user's play space given the placement of those objects. For example, if the person is walking towards the user but there is a sofa separating the person and the user, then the computing system may decide that an alert is unnecessary.

In particular embodiments, the computing system may only sound an alert when a new, previously-unobserved person entered the user's physical environment. For example, subject to the approval of the user, the computing system may compare the persons detected within a current frame with those detected in previous frames to determine whether a new person has entered the scene. For example, when the user puts on the HMD, the HMD may determine that another person is sitting on the couch who is watching the user play. There is no need to issue an alert for that person since, presumably, the user is already aware of the presence of that person. Later, when a second person enters the room, the computing system may compare its detection results with what was previously known and conclude that a new person has entered the room. In response, the computing system may trigger an alert to inform the user of the presence of the new person.

In particular embodiments, the trigger for the alert may be based on sound. For example, the HMD may have a microphone that could detect sound. The sound signal may be processed to help the computing system determine semantic information about the user's physical environment. For example, if the sound signal matches that of a doorbell or a knock on the door, the computing system may trigger an alert and provide passthrough visuals to the user. As another example, if the sound signal is of someone else speaking, the system could similarly trigger an alert. The sound signal may also be used in conjunction with semantic information extracted from images to boost the system's confidence in its semantic prediction. For example, in addition to determining from image data that another person is waving, the computing system may further determine that the person is speaking. Based on the combined knowledge that the person is both waving and speaking, the system could be more confident that the person is trying to get the attention of the user. In response, the system could trigger an alert that includes passthrough visuals of the person.

The computing system may present different types of alerts to the user. As described in further detail above, passthrough visuals may be presented in particular embodiments. The passthrough feature provides a perspective-accurate visualization of the user's surroundings by re-projecting the visual data captured by the external-facing cameras into the screen space of each eye of the user. At a high-level, the process for generating a passthrough visualization has two phases: generating a 3D model of the physical environment and rendering a passthrough visualization based on the 3D model. Through the external-facing cameras 105A-B of the HMD 104, a sequence of images of the surrounding physical environment may be captured. The information captured by the cameras 105A-B, however, would be misaligned with what the user's eyes would see since the cameras could not spatially coincide with the user's eyes (e.g., the cameras and the user's eyes have different viewpoints because they are located some distance away from each other). As such, simply displaying what the cameras captured to the user would not be an accurate representation of what the user should perceive. Thus, instead of simply displaying what was captured, the passthrough feature would re-project information captured by the external-facing cameras 105A-B to the user.

The passthrough visuals, in particular embodiments, may occupy the entire display of the HMD. In such cases, the user is taken out of virtual reality and presented with a passthrough reconstruction of the physical surroundings. In other embodiments, only a portion of the physical environment that is attributable to the cause of the alert may be displayed. For example, if an alert is triggered due to the detection of another person, the passthrough visualization may only include visual information associated with the detected person and not any other object in the physical environment (e.g., similar to what is shown in FIG. 5B). This design choice minimizes the alert feature's disruption to the user's immersive virtual-reality experience. To further minimize disruption, particular embodiments may display a gradient outline of the detected physical object of interest (e.g., the person 540) rather than a full visual representation of the objects (e.g., 545). Displaying only the outline minimizes the amount of occlusion to the virtual environment.

In particular embodiments, instead of displaying passthrough visualization, the system may present other forms of informative alerts. For example, the computing system may display an avatar or other visual representation of the detected person. To further minimize disruption, the system may display a textual, graphical, or audible alert without presenting the specific whereabouts of the detected person relative to the user. In particular embodiments, the system may show a radar that indicates the position of the detected person relative to the user.

Figure 6:
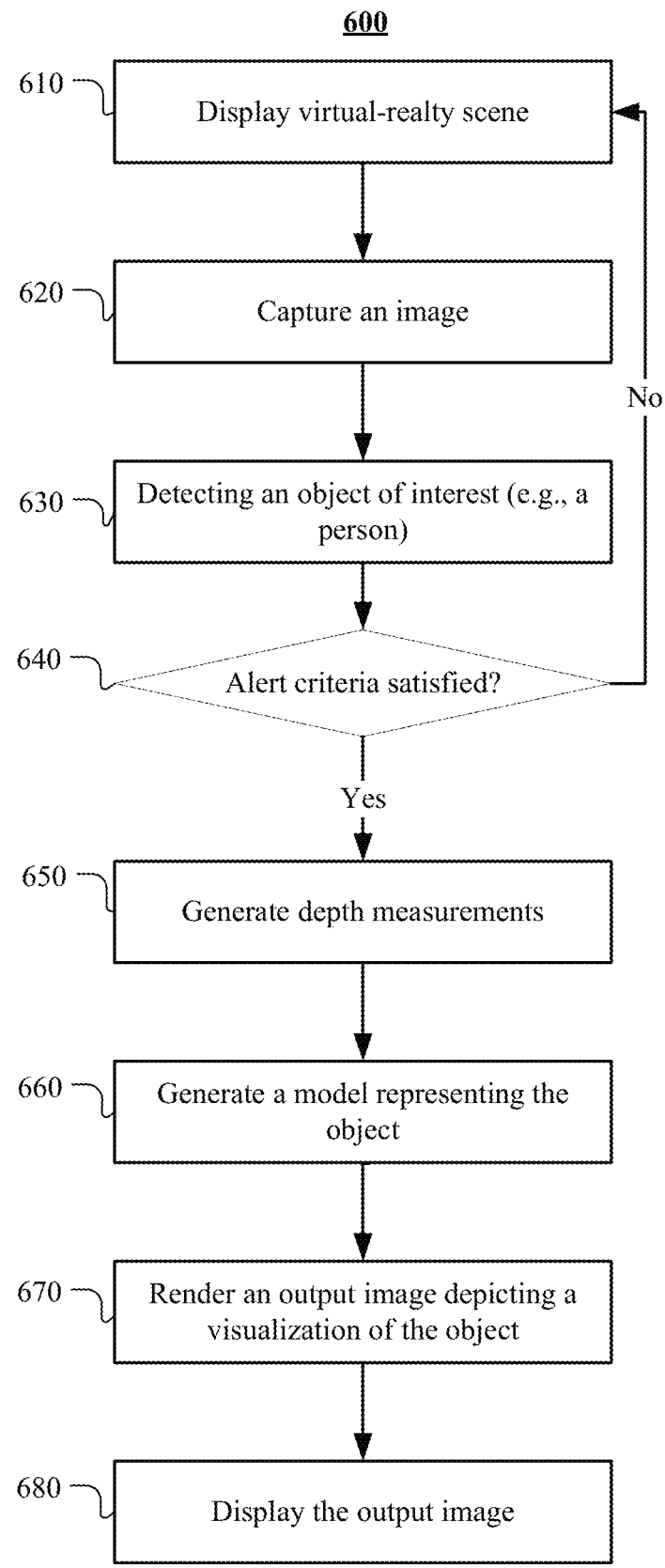
FIG. 6 illustrates an example method for providing a passthrough feature, in accordance with particular embodiments.

FIG. 6 illustrates an example method 600 for providing a passthrough feature. The method may begin at step 610, where a computing system associated with an artificial reality device may display a virtual-reality scene on a device worn by a user. The device worn by the user may be a head-mounted device that blocks the user from seeing the physical environment directly. At step 620, the system may capture an image of a physical environment surrounding the user. The image may be captured by a camera on the device worn by the user or by a mobile phone that is communicatively linked to the computing system. At step 630, the system may detect an object of interest in the image. For example, the system may use a machine-learning model or any suitable computer-vision technique to detect objects of interest (e.g., a person).

At step 640, the system may determine whether one or more alert criteria are satisfied based on the detected object. If the one or more alert criteria are not satisfied, then the computing system may continue to display the virtual-reality scene and continue to monitor the user's surroundings. On the other hand, if the one or more alert criteria are satisfied, then the computing system may generate an alert to provide the user with information about his physical surroundings. In particular embodiments, if a confidence score associated with the detection is higher than a predetermined threshold, then the criteria would be satisfied. As another example, the system may continue to capture one or more additional images of the physical environment surrounding the user and detect that the object of interest is present in those images. The system may determine that the alert criteria are satisfied based on the object of interest being detected in the one or more additional images. As another example, the system may determine that the object of interest in the image is performing an action (e.g., walking towards the user, waving or talking to the user, etc.) and, accordingly, determine that the one or more alert criteria are satisfied. As yet another example, the system may access a predefined region surrounding the user (e.g., a safe play space defined by the user or an automatically defined region) and predict whether the object of interest is likely to enter the predefined region. The system may determine that the one or more alert criteria are satisfied based on the prediction that the object of interest is likely to enter the predefined region.

At step 650, after the system has determined that the one or more alert criteria are satisfied, it may generate depth measurements of at least the object. For example, the system may use stereo images to compute the depth of observable features in the images. At step 660, the system may generate, based on the depth measurements, a model representing the object. The model may be, for example, a 3D mesh. At step 670, the system may render, based on a viewpoint of the user and the model, an output image depicting a visualization of the object. For example, the visualization of the object may be a passthrough visualization of a detected person. At step 680, the system may then display the output image on the device worn by the user in response to the determination that the one or more alert criteria are satisfied. The output image may replace the virtual-reality scene (e.g., in the case of a full passthrough visualization of the entire scene), or the output image may be displayed with the virtual-reality scene (e.g., similar to what is shown in FIG. 5B).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating 3D passthrough, including the particular steps of the method of FIG. 6, this disclosure contemplates any suitable method for generating 3D passthrough, including any suitable steps, which may include a subset of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
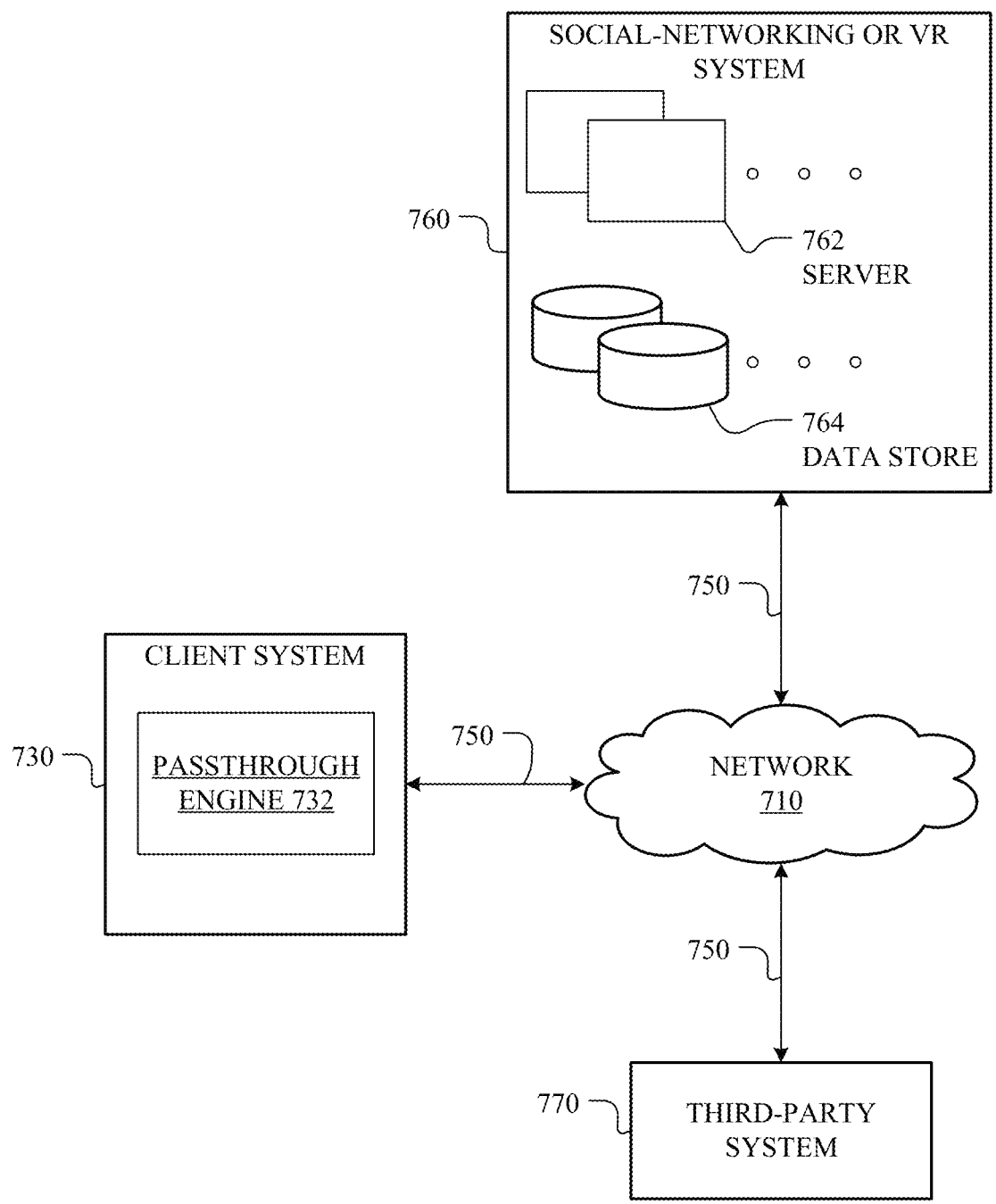
FIG. 7 illustrates an example network environment associated with an AR/VR or social-networking system.

FIG. 7 illustrates an example network environment 700 associated with an AR/VR or social-networking system. Network environment 700 includes a client system 730, a VR (or AR) or social-networking system 760, and a third-party system 770 connected to each other by a network 710. Although FIG. 7 illustrates a particular arrangement of client system 730, VR or social-networking system 760, third-party system 770, and network 710, this disclosure contemplates any suitable arrangement of client system 730, VR or social-networking system 760, third-party system 770, and network 710. As an example and not by way of limitation, two or more of client system 730, VR or social-networking system 760, and third-party system 770 may be connected to each other directly, bypassing network 710. As another example, two or more of client system 730, VR or social-networking system 760, and third-party system 770 may be physically or logically co-located with each other in whole or in part. Moreover, although FIG. 7 illustrates a particular number of client systems 730, VR or social-networking systems 760, third-party systems 770, and networks 710, this disclosure contemplates any suitable number of client systems 730, VR or social-networking systems 760, third-party systems 770, and networks 710. As an example and not by way of limitation, network environment 700 may include multiple client system 730, VR or social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 (e.g., an HMD) may include a passthrough engine 732 to provide the passthrough feature described herein, and may have one or more add-ons, plug-ins, or other extensions. A user at client system 730 may connect to a particular server (such as server 762, or a server associated with a third-party system 770). The server may accept the request and communicate with the client system 730.

In particular embodiments, VR or social-networking system 760 may be a network-addressable computing system that can host an online Virtual Reality environment or social network. VR or social-networking system 760 may generate, store, receive, and send social-networking data, such as, for example, user-profile data, concept-profile data, social-graph information, or other suitable data related to the online social network. Social-networking or VR system 760 may be accessed by the other components of network environment 700 either directly or via network 710. As an example and not by way of limitation, client system 730 may access social-networking or VR system 760 using a web browser, or a native application associated with social-networking or VR system 760 (e.g., a mobile social-networking application, a messaging application, another suitable application, or any combination thereof) either directly or via network 710. In particular embodiments, social-networking or VR system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking or VR system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking or VR system 760, or a third-party system 770 to manage, retrieve, modify, add, or delete, the information stored in data store 764.

In particular embodiments, social-networking or VR system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 760 may provide users of the online social network the ability to communicate and interact with other users. In particular embodiments, users may join the online social network via social-networking or VR system 760 and then add connections (e.g., relationships) to a number of other users of social-networking or VR system 760 to whom they want to be connected. Herein, the term "friend" may refer to any other user of social-networking or VR system 760 with whom a user has formed a connection, association, or relationship via social-networking or VR system 760.

In particular embodiments, social-networking or VR system 760 may provide users with the ability to take actions on various types of items or objects, supported by social-networking or VR system 760. As an example and not by way of limitation, the items and objects may include groups or social networks to which users of social-networking or VR system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 760 or by an external system of third-party system 770, which is separate from social-networking or VR system 760 and coupled to social-networking or VR system 760 via a network 710.

In particular embodiments, social-networking or VR system 760 may be capable of linking a variety of entities. As an example and not by way of limitation, social-networking or VR system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking or VR system 760. In particular embodiments, however, social-networking or VR system 760 and third-party systems 770 may operate in conjunction with each other to provide social-networking services to users of social-networking or VR system 760 or third-party systems 770. In this sense, social-networking or VR system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 760 also includes user-generated content objects, which may enhance a user's interactions with social-networking or VR system 760. User-generated content may include anything a user can add, upload, send, or "post" to social-networking or VR system 760. As an example and not by way of limitation, a user communicates posts to social-networking or VR system 760 from a client system 730. Posts may include data such as status updates or other textual data, location information, photos, videos, links, music or other similar data or media. Content may also be added to social-networking or VR system 760 by a third-party through a "communication channel," such as a newsfeed or stream.

In particular embodiments, social-networking or VR system 760 may include a variety of servers, sub-systems, programs, modules, logs, and data stores. In particular embodiments, social-networking or VR system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 760 may also include suitable components such as network interfaces, security mechanisms, load balancers, failover servers, management-and-network-operations consoles, other suitable components, or any suitable combination thereof. In particular embodiments, social-networking or VR system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 760 to one or more client systems 730 or one or more third-party system 770 via network 710. The web server may include a mail server or other messaging functionality for receiving and routing messages between social-networking or VR system 760 and one or more client systems 730. An API-request server may allow a third-party system 770 to access information from social-networking or VR system 760 by calling one or more APIs. An action logger may be used to receive communications from a web server about a user's actions on or off social-networking or VR system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking or VR system 760. A privacy setting of a user determines how particular information associated with a user can be shared. The authorization server may allow users to opt in to or opt out of having their actions logged by social-networking or VR system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
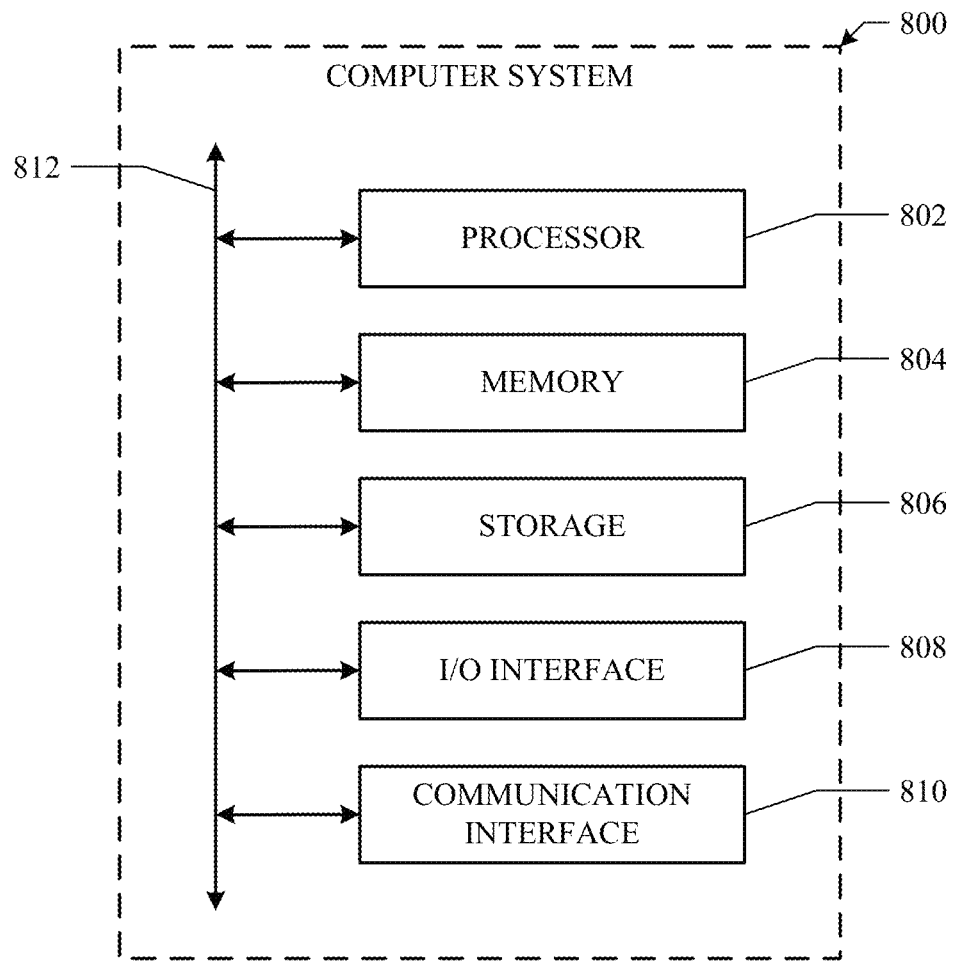
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
displaying a virtual-reality scene on a device worn by a user;
capturing a pair of stereo images of a physical environment surrounding the user via sensors of the device worn by the user;
detecting an object of interest in the pair of stereo images;
determining, based on the detected object, that one or more alert criteria are satisfied;
in response to determining that the one or more alert criteria for alerting the user of a notable event in the physical environment surrounding the user are satisfied, generating depth measurements of at least the object in the physical environment surrounding the user based on at least the pair of stereo images captured via the sensors of the device worn by the user;

generating, based on the depth measurements, a three-dimensional (3D) model representing the object;

determining a current viewpoint of an eye of the user;

reprojecting an image of the physical environment captured via one of the sensors of the device worn by the user based on the 3D model representing the object in the physical environment and the current viewpoint of the eye of the user, the reprojected image depicting a visualization of the object in the physical environment surrounding the user; and displaying, along with the virtual-reality scene, the reprojected image depicting the visualization of the object in the physical environment surrounding the user according to the current viewpoint of the eye of the user on the device worn by the user in response to the determination that the one or more alert criteria are satisfied.

2. The method of claim 1, further comprising:

capturing one or more additional images of the physical environment surrounding the user; and detecting the object of interest in the one or more additional images;

wherein the determination that the one or more alert criteria are satisfied is further based on the object of interest being detected in the one or more additional images.

3. The method of claim 1, further comprising:

determining that the object of interest in the pair of images is performing an action;

wherein the determination that the one or more alert criteria are satisfied is further based on the action performed by the object of interest.

4. The method of claim 1, further comprising:

accessing a predefined region surrounding the user; and predicting that the object of interest is likely to enter the predefined region;

wherein the determination that the one or more alert criteria are satisfied is further based on the prediction that the object of interest is likely to enter the predefined region.

5. The method of claim 1, wherein the object of interest is a person.

6. The method of claim 1, wherein the device worn by the user is a head-mounted device that blocks the user from seeing the physical environment directly.

7. The method of claim 1, wherein detecting the object of interest in the pair of stereo images comprises:

processing the pair of stereo images using a machine-learning model to detect the object of interest.

8. The method of claim 1, further comprising:

applying a gradient filter to the reprojected image, wherein the gradient filter highlights edges of the detected object in the pair of stereo images, and wherein the reprojected image after applying the gradient filter results in a line-based outline of the detected object over the virtual-reality scene.

9. One or more computer-readable non-transitory storage media embodying software that is operable when executed to:

display a virtual-reality scene on a device worn by a user;

capture a pair of stereo images of a physical environment surrounding the user via sensors of the device worn by the user;

detect an object of interest in the pair of stereo images;

determine, based on the detected object, that one or more alert criteria are satisfied;

in response to determining that the one or more alert criteria for alerting the user of a notable event in the physical environment surrounding the user are satisfied, generate depth measurements of at least the object in the physical environment surrounding the user based on at least the pair of stereo images captured via the sensors of the device worn by the user;

generate, based on the depth measurements, a three-dimensional (3D) model representing the object;

determine a current viewpoint of an eye of the user;

reproject an image of the physical environment captured via one of the sensors of the device worn by the user, based on the 3D model representing the object in the physical environment and the current viewpoint of the eye of the user, the reprojected image depicting a visualization of the object in the physical environment surrounding the user; and display, along with the virtual-reality scene, the reprojected image depicting the visualization of the object in the physical environment surrounding the user according to the current viewpoint of the eye of the user on the device worn by the user in response to the determination that the one or more alert criteria are satisfied.

10. The media of claim 9, wherein the software is further operable when executed to:

capture one or more additional images of the physical environment surrounding the user; and detect the object of interest in the one or more additional images;

wherein the determination that the one or more alert criteria are satisfied is further based on the object of interest being detected in the one or more additional images.

11. The media of claim 9, wherein the software is further operable when executed to:

determine that the object of interest in the pair of images is performing an action;

wherein the determination that the one or more alert criteria are satisfied is further based on the action performed by the object of interest.

12. The media of claim 9, wherein the software is further operable when executed to:

access a predefined region surrounding the user; and predict that the object of interest is likely to enter the predefined region;

wherein the determination that the one or more alert criteria are satisfied is further based on the prediction that the object of interest is likely to enter the predefined region.

13. The media of claim 9, wherein the device worn by the user is a head-mounted device that blocks the user from seeing the physical environment directly.

14. The media of claim 9, wherein to detect the object of interest in the pair of stereo images, the software is further operable when executed to:

process the pair of stereo images using a machine-learning model to detect the object of interest.

15. A system comprising:

one or more processors; and one or more computer-readable non-transitory storage media coupled to one or more of the processors and comprising instructions operable when executed by one or more of the processors to cause the system to:

display a virtual-reality scene on a device worn by a user;

capture a pair of stereo images of a physical environment surrounding the user via sensors of the device worn by the user;

detect an object of interest in the pair of stereo images;

determine, based on the detected object, that one or more alert criteria are satisfied;

in response to determining that the one or more alert criteria for alerting the user of a notable event in the physical environment surrounding the user are satisfied, generate depth measurements of at least the object in the physical environment surrounding the user based on at least the pair of stereo images captured via the sensors of the device worn by the user;

generate, based on the depth measurements, a three-dimensional (3D) model representing the object;

determine a current viewpoint of an eye of the user;

reproject an image of the physical environment captured via one of the sensors of the device worn by the user based on the 3D model representing the object in the physical environment and the current viewpoint of the eye of the user, the reprojected image depicting a visualization of the object in the physical environment surrounding the user; and display, along with the virtual-reality scene, the reprojected image depicting the visualization of the object in the physical environment surrounding the user according to the current viewpoint of the eye of the user on the device worn by the user in response to the determination that the one or more alert criteria are satisfied.

16. The system of claim 15, wherein the one or more processors are further operable when executing the instructions to cause the system to:

capture one or more additional images of the physical environment surrounding the user; and detect the object of interest in the one or more additional images;

wherein the determination that the one or more alert criteria are satisfied is further based on the object of interest being detected in the one or more additional images.

17. The system of claim 15, wherein the one or more processors are further operable when executing the instructions to cause the system to:

determine that the object of interest in the pair of images is performing an action;

wherein the determination that the one or more alert criteria are satisfied is further based on the action performed by the object of interest.

18. The system of claim 15, wherein the one or more processors are further operable when executing the instructions to cause the system to:

access a predefined region surrounding the user; and predict that the object of interest is likely to enter the predefined region;

wherein the determination that the one or more alert criteria are satisfied is further based on the prediction that the object of interest is likely to enter the predefined region.

19. The system of claim 15, wherein the device worn by the user is a head-mounted device that blocks the user from seeing the physical environment directly.

20. The system of claim 15, wherein to detect the object of interest in the pair of stereo images, the one or more processors are further operable when executing the instructions to cause the system to:

process the pair of stereo images using a machine-learning model to detect the object of interest.

\* \* \* \* \*